(12) United States Patent
Mochizuki et al.

(10) Patent No.: US 8,361,207 B2
(45) Date of Patent: Jan. 29, 2013

(54) ADSORBENT AND CANISTER

(75) Inventors: Yuji Mochizuki, Kakegawa (JP);
Takayuki Suzuki, Kakegawa (JP);
Tokio Oi, Kakegawa (JP)

(73) Assignee: Cataler Corporation, Kakegawa-shi (JP)

(*) Notice: Subject to any disclaimer, the term of this patent is extended or adjusted under 35 U.S.C. 154(b) by 314 days.

(21) Appl. No.: 12/683,712

(22) Filed: Jan. 7, 2010

(65) Prior Publication Data
US 2010/0107581 A1 May 6, 2010

Related U.S. Application Data

(63) Continuation of application No. PCT/JP2008/062517, filed on Jul. 10, 2008.

(30) Foreign Application Priority Data

Jul. 13, 2007 (JP) ................................ 2007-184142

(51) Int. Cl.
*B01J 20/20* (2006.01)
*B01J 20/28* (2006.01)
*B01D 53/04* (2006.01)
*F02M 25/08* (2006.01)

(52) U.S. Cl. ......................................... 96/153; 502/416

(58) Field of Classification Search .................... 96/108, 96/147, 154; 95/146, 900, 901; 502/416; 123/518–520
See application file for complete search history.

(56) References Cited

U.S. PATENT DOCUMENTS

| | | | | |
|---|---|---|---|---|
| 4,869,739 A | * | 9/1989 | Kanome et al. | 96/153 |
| 5,288,307 A | * | 2/1994 | Goltz et al. | 95/143 |
| 6,701,902 B2 | * | 3/2004 | Koyama et al. | 123/519 |
| 7,186,291 B2 | * | 3/2007 | Wolff | 96/132 |
| 7,967,899 B2 | * | 6/2011 | Aono | 96/154 |
| 2005/0014642 A1 | * | 1/2005 | Oi et al. | 502/416 |
| 2005/0066817 A1 | * | 3/2005 | Wolff | 96/108 |
| 2007/0266997 A1 | * | 11/2007 | Clontz et al. | 123/519 |

FOREIGN PATENT DOCUMENTS

| | | |
|---|---|---|
| JP | 2167809 | 6/1990 |
| JP | 2175608 | 7/1990 |
| JP | 6100311 | 4/1994 |
| JP | 7277716 | 10/1995 |
| JP | 8169706 | 7/1996 |
| JP | 2005-035812 | 2/2005 |
| JP | 2007-002709 | 1/2007 |
| WO | WO-03/106833 | 12/2003 |
| WO | WO-2007/077985 | 7/2007 |

OTHER PUBLICATIONS

Notification of the First Office Action mailed Jul. 22, 2011, for CN Patent Application No. 200880024118.0, with English Translation, nine pages.
International Search Report for PCT/JP2008/062517, mailed Sep. 22, 2008.
International Preliminary Report on Patentability mailed Feb. 18, 2010, for PCT Application No. PCT/JP2008/062517, filed Jul. 10, 2008, English Translation, six pages.

* cited by examiner

*Primary Examiner* — Frank Lawrence, Jr
(74) *Attorney, Agent, or Firm* — John P. White; Cooper & Dunham LLP

(57) ABSTRACT

An adsorbent having an excellent VOC-retaining ability is achieved. A adsorbent for a canister includes an activated carbon and a hydrophobic substance supported on the activated carbon, wherein the adsorbent has a butane working capacity that is greater than or equal to 9.0 g/100 mL, a butane retentivity that is lesser than or equal to 1.5 g/100 mL, and a pore volume that is lesser than or equal to 0.25 mL/mL.

2 Claims, 1 Drawing Sheet

ADSORBENT AND CANISTER

CROSS-REFERENCE TO RELATED APPLICATIONS

This is a Continuation Application of PCT Application No. PCT/JP2008/062517, filed Jul. 10, 2008, which was published under PCT Article 21(2) in Japanese.

This application is based upon and claims the benefit of priority from prior Japanese Patent Application No. 2007-184142, filed Jul. 13, 2007, the entire contents of which are incorporated herein by reference.

BACKGROUND OF THE INVENTION

1. Field of the Invention

The present invention relates to an adsorbent and a canister.

2. Description of the Related Art

Liquid fuel such as gasoline or light oil is used as fuel in most of automotive vehicles utilizing motive power generated by combustion engines. Since the liquid fuel contains volatile organic compounds (hereinafter referred to as VOCs), volatilization of VOCs in a fuel tank occurs over a nonoperational period during which the combustion engine stays stopped. Vaporization of VOC can increase an internal pressure of the fuel tank.

In an automobile having an internal combustion engine, vaporized VOCs are collected in a canister which includes an adsorbent in a closed container. Specifically, during the nonoperational period, the interior of the container is connected to the headspace of the fuel tank in order to allow the adsorbent made of activated carbon to adsorb the vaporized VOC. It should be noted that when activated carbon adsorbs VOCs, its adsorbability is lowered in accordance with an amount of adsorption. For this reason, in an automobile equipped with a canister, air is made flow through the adsorbent layer as a purge gas in an operational period during which an internal engine is in operation so as to cause desorption of VOCs from the activated carbon. Note that the gas discharged from the canister is burned in the internal combustion engine.

A canister requires that a sufficient amount of VOCs is adsorbed by activated carbon during the nonoperational period and a large proportion of adsorbed VOCs is desorbed from the activated carbon during the operational period. Although sufficient VOC adsorption and desorption amounts are achieved when activated carbon prepared by the methods described in Jpn. Pat. Appln. KOKAI Publication No. 2-175608, Jpn. Pat. Appln. KOKAI Publication No. 6-100311, Jpn. Pat. Appln. KOKAI Publication No. 7-277716 and Jpn. Pat. Appln. KOKAI Publication No. 8-169706 is used, a canister is required to further increase the VOC adsorption and desorption amounts. In addition, the methods described in the documents require a long period of time for activation treatment to obtain activated carbon.

BRIEF SUMMARY OF THE INVENTION

An object of the present invention is to provide a technique that is advantageous for achieving an adsorbent having an excellent VOC-retaining ability and preferably allows the manufacturing process of the adsorbent, in particular, the activation treatment to be performed easier.

According to a first aspect of the present invention, there is provided an activated carbon and a hydrophobic substance supported on the activated carbon, wherein the adsorbent has a butane working capacity that is greater than or equal to 9.0 g/100 mL, a butane retentivity that is lesser than or equal to 1.5 g/100 mL, and a pore volume that is lesser than or equal to 0.25 mL/mL.

According to a second aspect of the present invention, there is provided a canister comprising an adsorbent having an activated carbon and a hydrophobic substance, and a container contains the adsorbent, wherein the adsorbent has a butane working capacity that is greater than or equal to 9.0 g/100 mL, a butane retentivity that is lesser than or equal to 1.5 g/100 mL, and a pore volume that is lesser than or equal to 0.25 mL/mL.

It should be noted that "an adsorbent having an excellent VOC-retaining ability" refers to an adsorbent that is capable of desorbing a large proportion of VOC when it is allowed to adsorb mainly VOCs to saturation and subsequently the adsorbed VOCs, etc. are desorbed, to be more specific, achieving a large butane working capacity, in addition to decreasing the VOC amount remained in the adsorbent after the desorption, to be more specific, achieving a small butane retentivity.

DETAILED DESCRIPTION OF THE INVENTION

Figure 1:
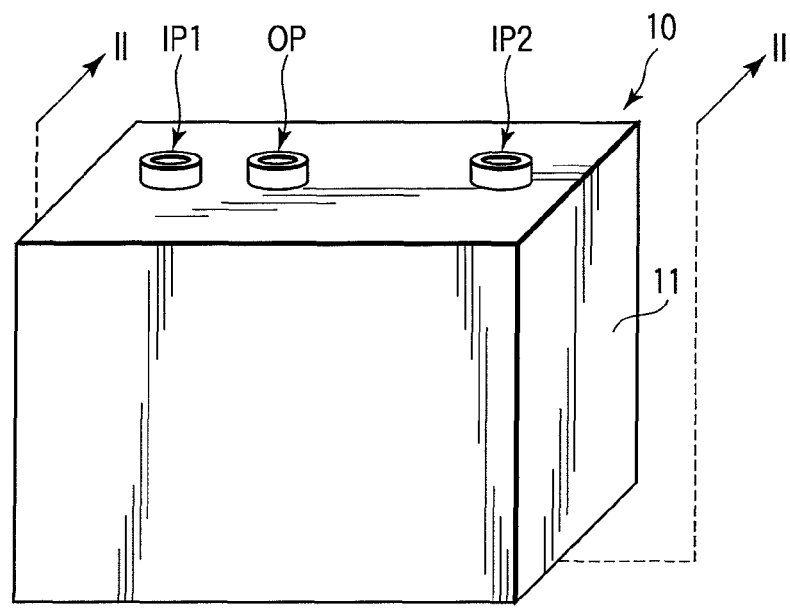
FIG. 1 is a perspective view schematically showing an example of a canister.

An embodiment of the present invention will be described below. Note that the same reference numerals in the drawings denote components that achieve the same or similar functions, and a repetitive explanation thereof will be omitted.

In the present embodiment, an adsorbent for a canister is manufactured, for example, by the following method.

First, a mixture of graphite and coal including anthracite is prepared as a carbonaceous material. It should be noted that the coal including anthracite is, for example, a mixture of anthracite and coal having a lower degree of carbonization. For example, coal having a degree of carbonization falling within a range of 50 to 90% by mass or coal containing 10 to 50% by mass of volatile is used as the coal having a lower degree of carbonization.

Next, the carbonaceous material is subjected to a pulverization process to prepare powder. The pulverization process may be performed before mixing the solid components constituting the carbonaceous material. In the case where powdery graphite is used, it is possible to subject coal to the pulverization process to prepare powder, subsequently add graphite thereto and mix them together.

Then, the powder of the carbonaceous material is added with a binder. For example, coal tar is used as the binder. After sufficiently mulling the mixture, it is formed into particles having appropriate dimensions. Typically, pellet-like particles are obtained.

Thereafter, the particles are subjected to a carbonization treatment. The carbonization treatment is performed by raising the temperature in a non-oxidizing atmosphere, for example, from ordinary temperatures to 400° C. or higher at a rate of temperature rise of, for example, 2.5 to 5° C./minute. The highest temperature reached in the carbonization treatment is set within a range of, for example, 500 to 700° C.

Further, the carbonized coal is subjected to a steam activation treatment. The steam activation treatment is performed by heating it in a steam atmosphere to a temperature within a range of, for example, 850 to 980° C.

Subsequently, the activated carbon is loaded with a hydrophobic substance. The activated carbon is loaded with the hydrophobic substance, for example, by spraying a liquid hydrophobic substance or a solution containing a hydrophobic substance to the activated carbon.

To be more specific, in the case where the hydrophobic substance is liquid, the hydrophobic substance is sprayed onto the activated carbon. When a hydrophobic substance having a high coefficient of viscosity is used, it is possible to heat the hydrophobic substance to lower its coefficient of viscosity and then spray it onto the activated carbon. Alternatively, it is possible that the fluid pressure of the hydrophobic substance is increased. Alternatively, it is possible that the hydrophobic material is mixed with a nonaqueous solvent and then the solution thus obtained is sprayed onto the activated carbon. The hydrophobic substance or the solution thereof may be sprayed onto the activated carbon heated beforehand.

Next, the activated carbon loaded with the hydrophobic substance is subjected to a heat treatment. When the heat treatment is performed, at least a part of the hydrophobic substance is vaporized, and at least a part of the vaporized hydrophobic substance is adsorbed by the activated carbon. As a result, the amount of the activated carbon not supporting the hydrophobic substance is decreased, and the hydrophobic substance can be evenly distributed on the surface of each activated carbon. Although the heat treatment can be performed in an open system, it is typically performed in a closed system. In the case where the heat treatment is performed in a closed system, decreasing the usage of the hydrophobic substance is easier and a ratio of the hydrophobic substance with respect to the activated carbon in the final product can be more easily set almost equal to a target value as compared with the case where it is performed in an open system.

In the case where the hydrophobic substance is solid, the hydrophobic substance is dissolved in a nonaqueous solvent. Next, the solution is sprayed onto the activated carbon, and then the activated carbon is dried, if necessary. Thereafter, the activated carbon loaded with the hydrophobic substance is subjected to the above heat treatment.

In these methods, the usage of the hydrophobic substance is set within a range of, for example, 1 to 15 parts by mass with respect to 100 parts by mass of the activated carbon. Typically, the usage of the hydrophobic substance is set within a range of 1 to 10 parts by mass with respect to 100 parts by mass of the activated carbon. As the nonaqueous solvent, for example, ethanol, ethers, carbon disulfide or benzene is used.

As the hydrophobic substance, for example, hydrocarbon-based organic materials can be used. As the hydrocarbon-based organic material, for example, a hydrocarbon-based organic material having a boiling point of 60° C. or higher can be used. Typically, a petroleum hydrocarbon is used as the hydrocarbon-based organic material.

Thus, the activated carbon supporting the hydrophobic substance can be obtained as an adsorbent for a canister.

According to this method, even in the case where the time period for the activation treatment is short, an adsorbent having an excellent VOC-retaining ability can be obtained, for example, by appropriately setting the composition of the carbonaceous material.

In addition, according to this method, an adsorbent supporting the hydrophobic substance and having a butane working capacity, a butane retentivity and a pore volume to be described below can be obtained.

"Butane working capacity" is a value obtained by "Standard Test Method for Determination of the Butane Working Capacity of Activated Carbon" stated as D5228-92 (2000) by American Society for Testing Materials. According to the above-described method, an adsorbent having a butane working capacity of 9.0 g/100 mL or more, in particular, 10.0 g/100 mL or more can be obtained.

An adsorbent having a great butane working capacity can adsorb a large amount of VOCs. Thus, for example, in the case where such an adsorbent is used in a canister, an internal pressure of a fuel tank is less prone to increase excessively.

"Butane retentivity" is a value used to calculate the butane working capacity. The butane retentivity is a value obtained by "Standard Test Method for Determination of the Butane Working Capacity of Activated Carbon" stated as D5228-92 (200) by American Society for Testing Materials. According to the above-described method, an adsorbent having a butane retentivity of 1.5 g/100 mL or less, in particular, 1.2 g/100 mL or less can be obtained.

From an adsorbent having a small butane retentivity, a large proportion of VOCs adsorbed thereby can be desorbed. Thus, for example, in the case where such an adsorbent is used in a canister, after the adsorbent is allowed to desorb VOCs, the adsorbent can adsorb a large amount of VOCs again.

"Pore volume" can be obtained using $N_2$ adsorption isotherm determined at 77.4K. To be more specific, in a nitrogen gas at 77.4K (a boiling point of nitrogen), an amount of nitrogen adsorbed by the adsorbent is determined for each pressure P while gradually increasing the pressure P (mmHg) of the nitrogen gas. Then, assuming the value obtained by dividing the pressure P (mmHg) by the saturation vapor pressure $P_0$ (mmHg) of the hydrogen gas as a relative pressure $P/P_0$, the amount of nitrogen adsorbed by the adsorbent is plotted for each relative pressure $P/P_0$ to obtain the adsorption isotherm. Thereafter, an $\alpha_s$-plot is formed using the adsorption isotherm, and then the pore volume is obtained therefrom. According to the above-described method, an adsorbent having a pore volume of 0.25 mL/mL or more, in particular, 0.30 mL/mL or more can be obtained. Note that this pore volume is equal to the product of a pore volume per unit mass and an apparent density.

It should be noted that each of the butane working capacity and the pore volume has no upper limit. The butane working capacity may be, for example, 18.0 g/100 mL or less or 15.0 mL/100 mL or less. The pore volume may be, for example, 0.50 mL/mL or less or 0.40 mL/mL or less. By contrast, the butane retentivity has no lower limit. The butane retentivity may be, for example, 0.1 g/100 mL or more or 0.2 g/100 mL or more.

In the case of normal activated carbon, when the mesopores are increased in order to increase the butane working capacity, the micropores also increase. As a result, the butane retentivity increases. That is, a great butane working capacity and a small butane retentivity are in a relation of trade-off.

Since the above-described process is performed under the following conditions (1) to (3), an adsorbent having a great butane working capacity and a small butane retentivity can be obtained.

(1) Coal having a small volatile content is used as a raw material of the activated carbon. In the case where coal having a small volatile content is used, although the rate of activation may be lowered, a high yield can be achieved.

(2) Graphite is further used as the raw material of the activated carbon. When graphite is used, an excessive combustion of carbon is suppressed to make it possible to manufacture activated carbon having a desired performance at high yield.

(3) The activated carbon is loaded with the hydrophobic substance, for example, a hydrophobic organic material, and subsequently subjected to a heat treatment at high temperatures. The micropores are clogged with the hydrophobic substance. The heat treatment at high temperatures prevents clogging of the mesopores. Thus, a great butane working capacity and a small butane retentivity can be achieved simultaneously.

The adsorbent is used, for example, in a canister described below.

Figure 2:
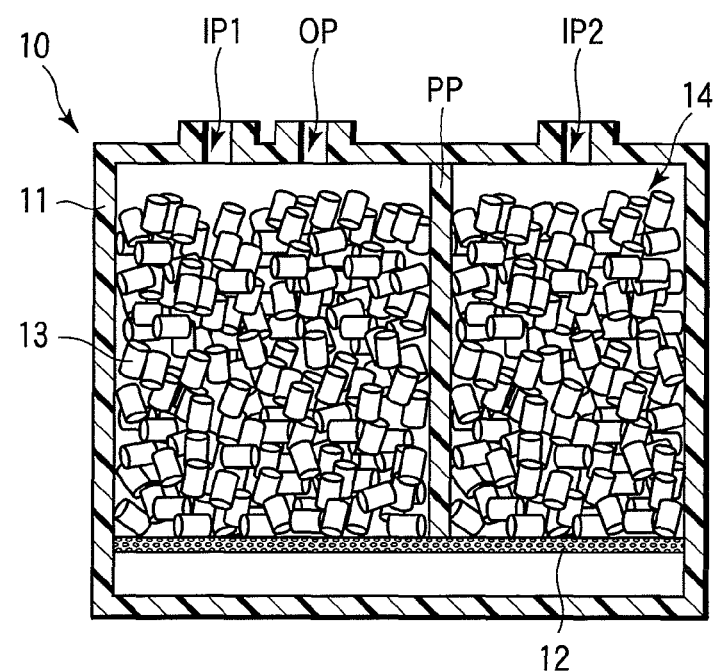
FIG. 2 is a sectional view taken along the line II-II of the canister shown in FIG. 1.

FIG. 1 is a perspective view schematically showing an example of a canister. FIG. 2 is a sectional view taken along the line II-II of the canister shown in FIG. 1.

The canister 10 includes a container 11 having an insulating inner surface. The container 11 is, for example, a closed container provided with an inlet port and an outlet port.

Here, as an example, the top plate portion of the container 11 is provided with a first inlet port IP1 for supplying a gas containing VOCs to the container 11, a second inlet port IP2 for supplying a purge gas to the container 11, and an outlet port OP for discharging the purge gas in the container 11. It should be noted that the purge gas is a gas such as air having a VOC concentration lower than that of the gas supplied to the container 11 through the first inlet port IP1.

Further, as an example, the container is provided with a partition plate PP extending from the top plate portion toward the bottom plate portion between the second inlet port IP2 and the outlet port OP. The partition plate PP divides the headspace of the container 11 into a front room to which the second inlet port IP2 is connected and a rear room to which the first inlet port IP1 and the outlet port OP are connected.

In the container 11, a porous plate 12 made of insulator is provided near the bottom. The porous plate 12 is spaced apart from the bottom plate portion of the container 11. Typically, the porous plate 11 is located such that its upper surface is in contact with the partition plate PP. When such a structure is employed, the front room and the rear room are communicated to each other only through the bottom space between the bottom plate portion of the container 11 and the porous plate 12. Note that the porous plate 12 may be omitted.

In the container 11, an adsorbent layer 14 including particulate adsorbent 13 is provided above the porous plate 12. The adsorbent 13 is the adsorbent obtained by the above-described method. In the case of placing the partition plate PP, the thickness of the adsorbent layer 14 is such that an end portion of the partition plate PP on the side of the porous plate 12 is embedded therein.

This canister 10 uses the adsorbent 13 obtained by the above-described method. Therefore, the canister 10 has an excellent VOC-retaining ability.

Examples of the present invention will be described below.

<Manufacture of Adsorbent A1>

First, coal containing anthracite and having a volatile content of 12.5% by mass was prepared. The coal was subjected to a pulverization process to prepare powder, and this powder and graphite were mixed together at a mass ratio of 100:5.

Next, coal tar was added to the powder of the carbonaceous material. After sufficiently mulling the mixture, it was formed into pellets. Each pellet had a columnar shape with a diameter of 3 mm and a height of 5±3 mm.

Then, the pellets were subjected to a carbonization treatment and a steam activation treatment in this order. The carbonization treatment was performed such that the highest temperature of 700±50° C. was reached. The steam activation treatment was performed such that an amount of steam supply per 1 g of the carbonized coal was 20±10 mg/minute and the temperature was set at 950±50° C. The time period from the start of the carbonization treatment to the end of the steam activation treatment was about 700 minutes (the time period between these processes are excluded), and about 250 minutes were spent for the carbonization treatment.

Thereafter, a hydrocarbon-based organic composition having a boiling point of about 150 to 400° C. was sprayed onto the activated carbon. The usage of the hydrocarbon-based organic material was 5 parts by mass with respect to 100 parts by mass of the activated carbon.

Further, using a closed drier, the pellets supporting the hydrocarbon-based organic composition were subjected to a heat treatment at 200° C. for 60±20 minutes. Hereinafter, the adsorbent thus obtained is referred to as "adsorbent A1".

<Manufacture of Adsorbent A2>

An adsorbent was manufactured by almost the same method as that described for the adsorbent A1 except that the volatile content of the coal containing anthracite was 14.6% by mass and the usage of the hydrocarbon-based organic composition was 20 parts by mass with respect to 100 parts by mass of the activated carbon. Hereinafter, the adsorbent is referred to as "adsorbent A2".

<Manufacture of Adsorbent A3>

An adsorbent was manufactured by almost the same method as that described for the adsorbent A1 except that anthracite having a volatile content of 9% by mass was used as the coal containing anthracite. Hereinafter, the adsorbent is referred to as "adsorbent A3".

<Manufacture of Adsorbent A4>

An adsorbent was manufactured by almost the same method as that described for the adsorbent A1 except that coal having a volatile content of 23% by mass was used instead of the coal containing anthracite. Hereinafter, the adsorbent is referred to as "adsorbent A4".

<Manufacture of Adsorbent A5>

An adsorbent was manufactured by almost the same method as that described for the adsorbent A1 except that graphite was not used. Hereinafter, the adsorbent is referred to as "adsorbent A5".

<Manufacture of Adsorbent A6>

An adsorbent was manufactured by almost the same method as that described for the adsorbent A1 except that the activated carbon was not loaded with the hydrocarbon-based organic composition. Hereinafter, the adsorbent is referred to as "adsorbent A6".

<Manufacture of Adsorbent A7>

Coal containing anthracite and having a volatile content of 10.5% by mass was prepared. The coal was subjected to the pulverization process to prepare powder, and this powder and graphite were mixed together at a mass ratio of 100:3. An adsorbent was manufactured by almost the same method as that described for the adsorbent A1 except that the powder of carbonaceous material thus obtained was used. Hereinafter, the adsorbent is referred to as "adsorbent A7".

<Manufacture of Adsorbent A8>

Coal containing anthracite and having a volatile content of 18.0% by mass was prepared. The coal was subjected to the pulverization process to prepare powder, and this powder and graphite were mixed together at a mass ratio of 100:10. An adsorbent was manufactured by almost the same method as that described for the adsorbent A1 except that the powder of carbonaceous material thus obtained was used and the usage of the hydrocarbon-based organic composition was 20 parts by mass with respect to 100 parts by mass of the activated carbon. Hereinafter, the adsorbent is referred to as "adsorbent A8".

<Manufacture of Adsorbent A9>

An adsorbent was manufactured by almost the same method as that described for the adsorbent A1 except that the volatile content of the coal containing anthracite was 18.0% by mass and the usage of the hydrocarbon-based organic composition was 10 parts by mass with respect to 100 parts by mass of the activated carbon. Hereinafter, the adsorbent is referred to as "adsorbent A9".

<Evaluation>

Butane working capacity, butane retentivity, pore volume and hardness were determined for each of the adsorbents A1 to A9 by the methods stated in Japan Industrial Standard JIS K1474(2007), "Test method for activated carbon". The results, together with productivities and yields are summarized in the table below.

TABLE 1

| Adsorbent | BWC (g/100 mL) | BR (g/100 mL) | Pore volume (mL/mL) | Hardness | Yield | Productivity | Evaluation |
|---|---|---|---|---|---|---|---|
| A1 | 11.5 | 1.2 | 0.33 | 100 | 100 | 100 | ○ |
| A2 | 9.5 | 0.3 | 0.26 | 100 | 120 | 120 | ○ |
| A3 | 13.0 | 3.0 | 0.36 | 100 | 75 | 65 | X |
| A4 | 6.5 | 0.1 | 0.18 | 20 | 100 | 120 | X |
| A5 | 10.5 | 2.5 | 0.30 | 70 | 80 | 80 | X |
| A6 | 11.5 | 2.5 | 0.36 | 100 | 100 | 100 | X |
| A7 | 12.5 | 1.5 | 0.37 | 100 | 100 | 100 | ○ |
| A8 | 9.0 | 1.0 | 0.25 | 100 | 120 | 120 | ○ |
| A9 | 10.0 | 1.0 | 0.35 | 100 | 140 | 140 | ◎ |

In the above table, hardness, yield and productivity are shown as relative values when the values obtained for the adsorbent A1 are supposed to be 100. The yield corresponds to a mass ratio of the product with respect to the raw material. The productivity corresponds to a value obtained by dividing the output by the time necessary for the manufacture of the adsorbent (the time period spent for loading with the hydrocarbon-based organic composition is excluded) and is shown as a relative value when the value obtained for the adsorbent A1 is supposed to be 100. Except for the time period spent for the steam activation, the time periods spent for the steps of manufacturing each of the adsorbents A2 to A5 and A7 to A9 are equal to the time periods spent for the steps of manufacturing the adsorbent A1, respectively. Except for the time period spent for loading with the hydrocarbon-based organic composition, the time periods spent for the steps of manufacturing the adsorbent A6 are equal to the time periods spent for the steps of manufacturing the adsorbent A1, respectively.

As shown in the above table, the adsorbents A1, A2 and A7 to A9 have great butane working capacities, large pore volumes, small butane retentivities, and sufficient hardness. In addition, the adsorbents A1, A2 and A7 to A9 could be manufactured at high yields and high productivities.

Then, the canister 10 shown in FIGS. 1 and 2 was manufactured using each of the adsorbents A1 to A9. VOCs-adsorbing and desorbing properties ware determined for each canister 10 Here, gasoline was used as VOCs. As a result, in the case of the canisters 10 using the adsorbents A1, A2 and A7 to A9, a temperature drop on the desorption of VOCs was smaller and a higher efficiency of desorption was achieved as compared with the case of the canisters 10 using the adsorbents A3 to A6.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An adsorbent for a canister, comprising an activated carbon and a hydrophobic substance supported on the activated carbon, wherein the adsorbent has a butane working capacity that is greater than or equal to 9.0 g/100 mL, a butane retentivity that is lesser than or equal to 1.5 g/100 mL, and a pore volume that is greater than or equal to 0.25 mL/mL.

2. A canister comprising:
    an adsorbent having an activated carbon and a hydrophobic substance; and
    a container contains the adsorbent, wherein the adsorbent has a butane working capacity that is greater than or equal to 9.0 g/100 mL, a butane retentivity that is lesser than or equal to 1.5 g/100 mL, and a pore volume that is greater than or equal to 0.25 mL/mL.

* * * * *